United States Patent
Brosowsky et al.

(10) Patent No.: US 10,928,202 B2
(45) Date of Patent: Feb. 23, 2021

(54) SYSTEM AND METHODS FOR THREE-DIMENSIONAL VOLUMETRIC INDOOR LOCATION GEOCODING

(71) Applicant: Geo-Comm Inc., Saint Cloud, MN (US)

(72) Inventors: John T. Brosowsky, Albany, MN (US); Avery Penniston, Sartell, MN (US); Steven Henningsgard, St. Cloud, MN (US)

(73) Assignee: Geo-Comm Inc., St. Cloud, MN (US)

( * ) Notice: Subject to any disclaimer, the term of this patent is extended or adjusted under 35 U.S.C. 154(b) by 516 days.

(21) Appl. No.: 15/856,690

(22) Filed: Dec. 28, 2017

(65) Prior Publication Data
US 2018/0188035 A1 Jul. 5, 2018

Related U.S. Application Data

(60) Provisional application No. 62/440,443, filed on Dec. 30, 2016.

(51) Int. Cl.
*G06F 16/29* (2019.01)
*G01C 21/20* (2006.01)
(Continued)

(52) U.S. Cl.
CPC .......... *G01C 21/206* (2013.01); *G06F 16/29* (2019.01); *H04W 4/023* (2013.01); *G06F 16/487* (2019.01); *G06F 16/50* (2019.01); *G09B 29/003* (2013.01)

(58) Field of Classification Search
CPC ....... G01C 21/206; G06F 16/29; G06F 16/50; G06F 16/487; H04W 4/023; G09B 29/003
See application file for complete search history.

(56) References Cited

U.S. PATENT DOCUMENTS 6,934,634 B1 8/2005 Ge
7,668,651 B2 2/2010 Searight et al.
(Continued)

FOREIGN PATENT DOCUMENTS

WO 2016117738 A1 7/2016

OTHER PUBLICATIONS

Lee, Jiyeong, GIS-based geocoding methods for area-based addresses and 3D addresses in urban areas; Environment and Planning B: Planning and Design 2009, vol. 36, pp. 86-106.
(Continued)

*Primary Examiner* — Yi Wang
(74) *Attorney, Agent, or Firm* — Michael A. Bondi; Moss & Barnett

(57) ABSTRACT

A computer implemented method for three-dimensional volumetric indoor location geocoding relative to a geographic location is provided. The method includes: creating a three-dimensional representation of the geographic location; notionally subdividing the three-dimensional representation into an array of discrete elements; receiving an address and converting the address into geographic coordinates; querying the array of discrete elements representing the geographic location; determining a list of all discrete elements with at least one of a matching address and sub-address element attribute; generating a notional minimum bounding three-dimensional polygon containing the matched discrete elements with the at least one matched address and matched sub-address element attribute; determining a list of geodetic coordinates defining the minimum bounding three-dimensional polygon; and presenting the list of geodetic coordinates defining the minimum bounding three-dimensional polygon.

24 Claims, 6 Drawing Sheets

(51) Int. Cl.
*H04W 4/02* (2018.01)
*G06F 16/50* (2019.01)
*G06F 16/487* (2019.01)
*G09B 29/00* (2006.01)

(56) References Cited

U.S. PATENT DOCUMENTS

| | | |
|---|---|---|
| 8,244,802 B2 | 8/2012 | Mitchell |
| 8,290,510 B2 | 10/2012 | Thomson |
| 8,731,585 B2 | 5/2014 | Zarem et al. |
| 8,972,167 B1 | 3/2015 | Takyar et al. |
| 8,996,545 B2 | 3/2015 | Chen et al. |
| 9,020,941 B1 | 4/2015 | Gupta et al. |
| 9,087,132 B2 | 7/2015 | Mitchell |
| 9,148,491 B2 | 9/2015 | Mitchell, Jr. |
| 2007/0162228 A1 | 7/2007 | Mitchell |
| 2010/0034179 A1 | 2/2010 | Semper |
| 2010/0317317 A1 | 12/2010 | Maier |
| 2014/0244635 A1* | 8/2014 | Hu .................. G06K 9/4638 707/724 |
| 2014/0320485 A1 | 10/2014 | Neophytou et al. |
| 2017/0094471 A1* | 3/2017 | Sendonaris ............. G01S 19/42 |

OTHER PUBLICATIONS

Emergent Communication; "Emergent Communications 9-1-1 Software Solutions for Call Routing and Delivery"; technical White Paper, May 2017, 9 pgs.

National Emergency umber Association (NENA) Technical Committee Chairs; "NENA Standard for the Implementation of the Wireless Emergency Service Protocol E2 Interface"; NENA-05-001, Dec. 2, 2003, 47 pgs.

\* cited by examiner

SYSTEM AND METHODS FOR THREE-DIMENSIONAL VOLUMETRIC INDOOR LOCATION GEOCODING

PRIORITY CLAIM AND CROSS-REFERENCE TO RELATED APPLICATIONS

The present application claims priority to U.S. Provisional Patent Application Ser. No. 62/440,443, filed Dec. 30, 2016, which is hereby incorporated by reference in its entirety for all purposes.

BACKGROUND

The embodiments described herein relate to geographic information systems and methods for representation of geographic locations in a computer based mapping system, and more particularly, conversion of textual civic addresses with sub-address elements into three-dimensional volumetric geometries at varying resolutions.

Conventional computer systems include two dimensional geocoding capabilities transforming a civic (postal) address (for example: "800 Railroad Ave, Albany, Minn.") to a location on the Earth's surface expressed in numerical geodetic coordinates (for example: "45.63039, −94.57543"). Typical capabilities can be useful in computer mapping applications where it is desirable to display the location of a street address on a map on a computer screen.

Commonly, two dimensional geocoding systems can use either: address feature database matching methods or address ranged road centerline interpolation methods. The address feature database matching method relies on a pre-built geographic database of known locations such as address points on map. The address point record in the database can include textual information describing the address (for example: "800 Railroad Ave, Albany, Minn.") as well as a spatial representation in numerical format (for example: "45.63039, −94.57543"). Typically, text which can include the input address can be matched to corresponding address text in the pre-built geographic database; and, the spatial representation for the matching geographic database record is returned as the geocode result for the submitted address.

The address ranged road centerline interpolation method utilizes a pre-built geographic database describing linear segments of roadway with each attributed with low and high address range numbers for left and right sides of the street, along with a set of geographic coordinates defining the roadway segment. Conventionally, text which can include the street name and community name or zip code of the input address is used to select road centerline segments in the geographic database having the same street name and community or zip code. The single street centerline segment containing the address can be determined by comparing the text having the building number of the input address with the low and high address ranges from the list of possible matches.

Once a single road centerline segment is found, a point location for the address can be estimated by determining the percentage along the street centerline segment based on the building number of the input address and the address ranges attributed to the centerline segment. A point location can be orthogonally offset to the left or right side of the street based on parity of the input building number and parity of address ranges assigned to the left and to the right side of the street centerline segment. This point location is then returned as the geocode result for the input address.

While traditional two dimensional geocoding methods can be successful, typical two dimensional geocoding methods may not be optimal for depicting locations inside of buildings or venues. More particularly, the address ranged road centerline method may not work well indoors where there are no streets and where there are multiple building levels. The database matching method may not work well indoors where two dimensional points (for example, marking a pin on a map indicating the street ingress to a property) cannot be used to represent locations on multiple floors vertically in a building or venue.

There is a need in the industry for conversion of textual civic addresses with sub-address elements into three-dimensional volumetric geometries at varying resolutions. Moreover, there is a need in the industry for a specialized geographic database representing a building or venue, wherein the total three-dimensional space of the building or venue is notionally subdivided into an array of discrete elements represented as three-dimensional cubes, or other appropriate three-dimensional geometric shapes. Furthermore, there is a need in the industry for increasing refinement of geographic locations for the array of discrete elements.

BRIEF DESCRIPTION

In one aspect, a computer implemented method for three-dimensional volumetric indoor location geocoding relative to a geographic location is provided. The method includes creating a three-dimensional representation of the geographic location, notionally subdividing the three-dimensional representation into an array of discrete elements, receiving an address and converting the address into geographic coordinates, querying the array of discrete elements representing the geographic location, determining a list of all discrete elements with at least one of a matching address and sub-address element attribute, generating a notional minimum bounding three-dimensional polygon containing the matched discrete elements with the at least one matched address and matched sub-address element attribute, determining a list of geodetic coordinates defining the minimum bounding three-dimensional polygon, and presenting the list of geodetic coordinates defining the minimum bounding three-dimensional polygon.

In a further aspect, a computer device for three-dimensional volumetric indoor location geocoding relative to a geographic location is provided. The computer device includes a memory device configured to store the geographic location, an interface device coupled to the memory device and configured to receive input instructions, and a processor coupled to the memory device and the interface device. The processor is programmed to create a three-dimensional representation of the geographic location, notionally subdivide the three-dimensional representation into an array of discrete elements, receive an address and converting the address into geographic coordinates, query the array of discrete elements representing the geographic location, determine a list of all discrete elements with at least one of a matching address and sub-address element attribute, generate a notional minimum bounding three-dimensional polygon containing the matched discrete elements with the at least one matched address and matched sub-address element attribute, determine a list of geodetic coordinates defining the minimum bounding three-dimensional polygon, and present the list of geodetic coordinates defining the minimum bounding three-dimensional polygon.

In another aspect, one or more non-transitory computer-readable media are provided. The non-transitory computer-readable media have computer-executable instructions embodied thereon for three-dimensional volumetric indoor location geocoding relative to a geographic location using a computer device having a memory and a processor. When executed by the processor, the computer-readable instructions cause the processor to create a three-dimensional representation of the geographic location, notionally subdivide the three-dimensional representation into an array of discrete elements, receive an address and converting the address into geographic coordinates, query the array of discrete elements representing the geographic location, determine a list of all discrete elements with at least one of a matching address and sub-address element attribute, generate a notional minimum bounding three-dimensional polygon containing the matched discrete elements with the at least one matched address and matched sub-address element attribute, determine a list of geodetic coordinates defining the minimum bounding three-dimensional polygon, and present the list of geodetic coordinates defining the minimum bounding three-dimensional polygon.

DRAWINGS

These and other features, aspects, and advantages will become better understood when the following detailed description is read with reference to the accompanying drawings in which like characters represent like parts throughout the drawings, wherein.

Figure 5:
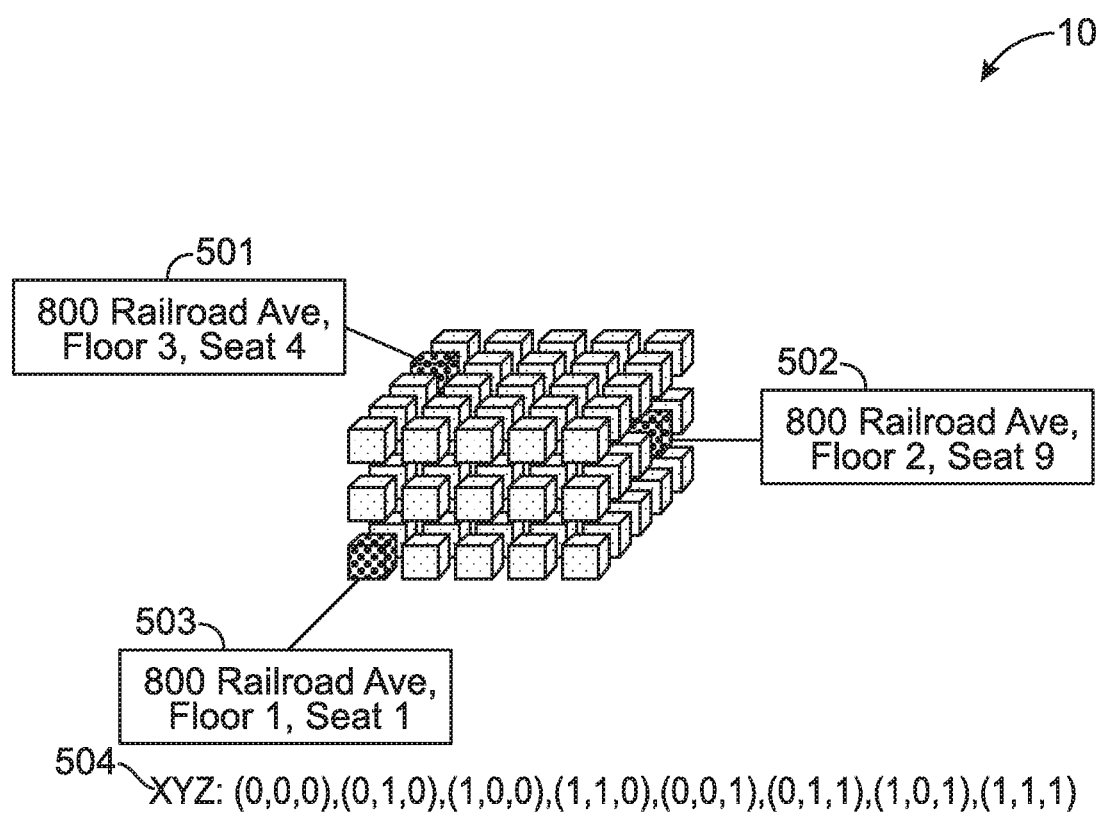
Figure 6:
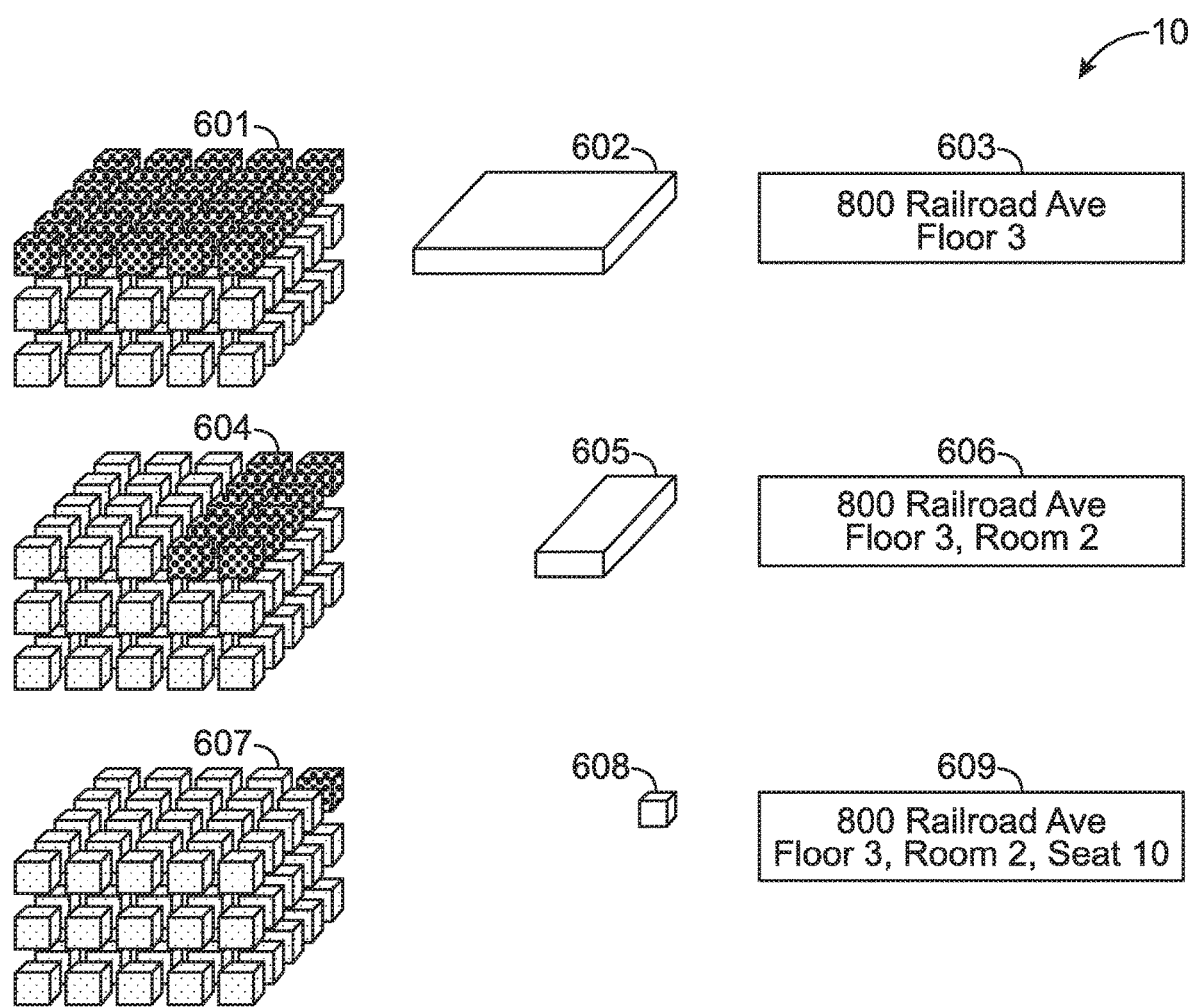

FIG. 5 is a schematic view of the geographic information system and an exemplary rectangular office building broken into an evenly spaced notional array of discrete three-dimensional cubes, where each individual cube represents an individual workspace in the building; and FIG. 6 is schematic view of the geographic information system and an exemplary rectangular office building broken into an evenly spaced notional array of discrete three-dimensional cubes, where each individual cube represents an individual workspace in the building, and also may be grouped by coarser grained location information such as floor and room to form larger geometric shapes.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

The embodiments described herein relate to systems and methods of geographic information systems, and more particularly, to three-dimensional volumetric indoor location geocoding. The embodiments described herein relate particularly to conversion of textual civic addresses with sub-address elements into three-dimensional volumetric geometries at varying resolutions. Moreover, the embodiments relate to a specialized geographic database representing a building or venue, wherein the total three-dimensional space of the building or venue is notionally subdivided into an array of discrete elements, where each discrete element is a three-dimensional cube, or other suitable three-dimensional geometry, represented by eight geodetic coordinate pairs. Further, each three-dimensional cube or geometry is attributed with an array of location information where each element of the array contains increasing refinement of location such as, but not limited to, street address, building name, place type, unit, room, and seat.

The embodiments described also allow for a "reverse geocoding" process that allows for inputs of geographic coordinate values or spatial areas which can then be processed to civic addresses with sub-address elements. In one example, the reverse geocoding process allows for input or receipt of geographic coordinates to identify a location such as a building. Such geographic coordinates may typically be represented as a set of latitude, longitude, and elevation values or as a pair of latitude and longitude values. The systems described herein are configured to convert such geographic coordinates into a textual civic address or another appropriate geographic identifier that describes a location. For example, for particular specified geographic coordinates, a textual civic address with sub-address elements may be determined including, for example, floor and room numbers for a particular building.

In another example of reverse geocoding, the embodiments allow for the input of area and volume geometries specifying an area of physical space. For example, the systems described can receive inputs of coordinate values representing a three-dimensional area as a sphere, a cube, or other suitable geometries. Further, the systems described can receive inputs of specified two-dimensional areas that can be extrapolated to three-dimensional spaces, such as but not limited to circles, ellipses, squares, rectangles, and triangles. Additionally, the systems described can receive inputs of three-dimensional spaces such as spheres, cubes, and other suitable shapes. In operation, the system allows for receipt of a drawn area, space, or other shape over a map which can then be reverse geocoded and converted to a civic address with sub-address elements. Such inputs can be received and processed individually or in batches.

In some embodiments, the discreet elements may include or comprise three-dimensional shapes other than cubes including, for example, prisms, pyramids, spheres, polygons, and other suitable three-dimensional shapes. In some embodiments, the discreet elements may include more than one type of three-dimensional shape.

Additionally, although the systems described allow for the processing locations into sub-elements such as rooms, locations may also be refined to identify sub-elements including those that are adjoining, above, or below the locations. For example, locations may include structures such as roofs, ramps, patios, terminals, offices, and basements and such structures may be sub-elements that are determined by the systems. As such, the embodiments described herein may allow for a refined location to be specified that is based on a location that does not wholly encompass it, but rather is adjacent or proximate to it.

The embodiments described herein relate to a geocoding components that receive an address (typically, but not limited to, a textual address) to be converted into geographic coordinates. The geocoding component queries an array of discrete element cubes representing the building or venue, and determines a list of all discrete cubes with matching address and sub-address element attributes. In the embodiments described herein, a notional minimum bounding three-dimensional polygon containing the set of matched discrete cubes is computed, and the list of geodetic coordinates defining the minimum bounding three-dimensional polygon is returned as the geocode result. It should be understood that the descriptions and figures that utilize postal codes and/or a building are exemplary only. The exemplary system can be used with other applications to identify and geo-locate any type of data and any type of location. Further, in some embodiments, the three-dimensional polygons may include shapes other than cubes.

In the exemplary embodiments, the descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be understood, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processor", "processing" or "computing" or "calculating" or "determining" or "displaying" or the like, refer to the action and processes of a computer system, or similar electronic computing device, that manipulates and transforms data represented as physical (electronic) quantities within the computer systems' registers and memories into other data similarly represented as physical quantities within the computer system memories or registers or other such information storage, transmission or display devices.

The embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The embodiments can take the form of an entirely hardware embodiment, an entirely software embodiment or an embodiment containing both hardware and software elements. In a preferred embodiment, the exemplary embodiment is implemented in software, which includes but is not limited to firmware, resident software, and microcode. Furthermore, the exemplary embodiment can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks, modems, cable modem and Ethernet cards are just a few of the currently available types of network adapters.

The software, algorithm and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is described with reference to a particular programming language. It will be appreciated that a variety of programming languages may be used to implement the teachings of the invention as described herein.

Figure 1:
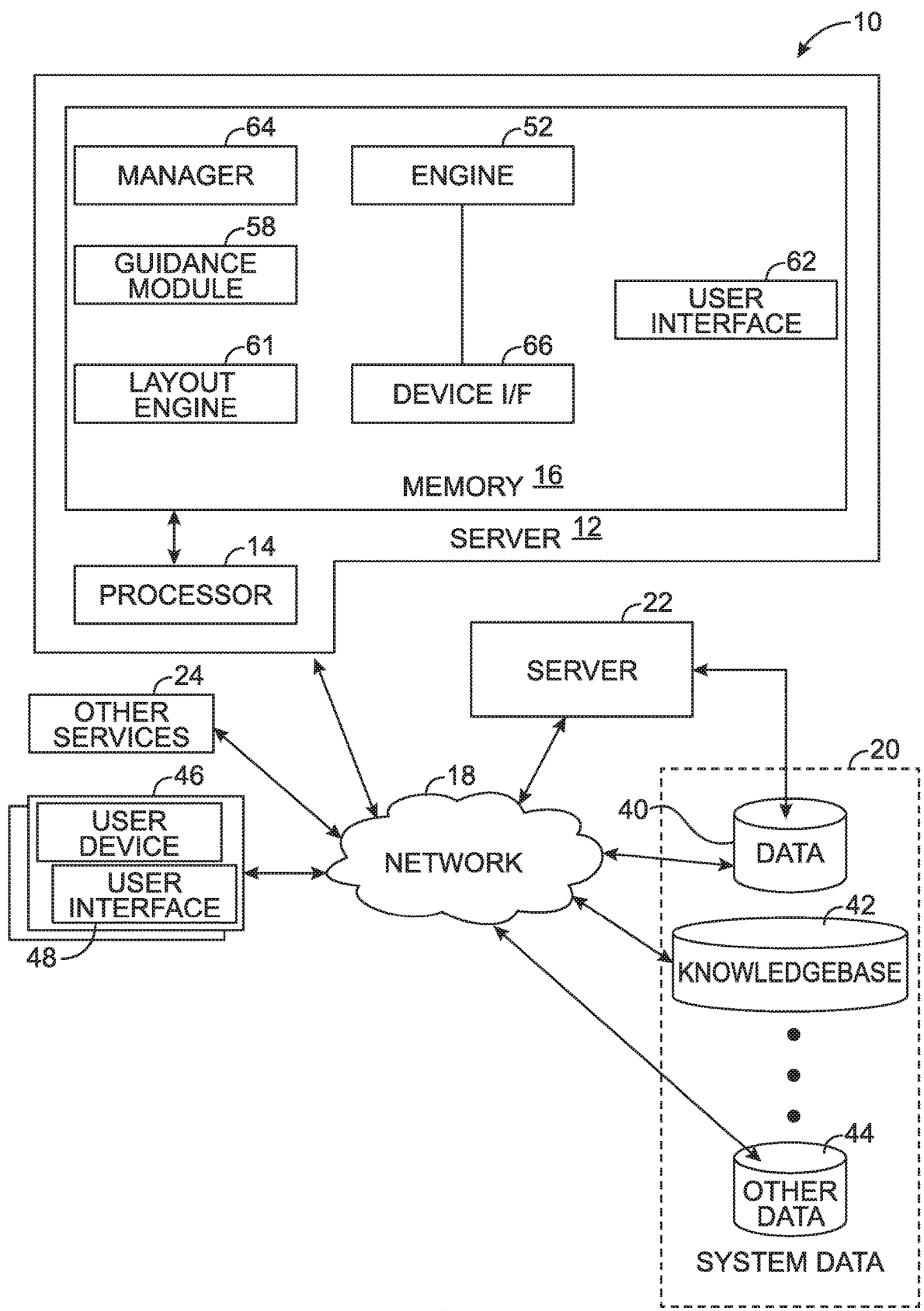
FIG. 1 is a schematic view of an exemplary geographic information system for three-dimensional volumetric indoor location geocoding.

FIG. 1 depicts a geographic information system 10 for three-dimensional volumetric indoor location geocoding. The geographic information system includes a server 12. The server 12 can include one or more processors 14 and memory 16. The memory 16 can store data and machine readable instructions that can be executed by the processor 14. For example, the memory 16 can comprise physical memory, such as can reside on the processor 14 (for example, processor memory), random access memory or other physical storage media (for example, CD-ROM, DVD, flash drive, hard disc drive, etc.) or a combination of different memory devices that can store the machine readable instructions. The memory 16 further can be implemented within a single machine, as depicted in FIG. 1, or it can be distributed across multiple machines. The data utilized for implementing the systems and methods described herein can also be stored in the memory 16 or in some other arrangement of one or more memory structures that are accessible for use by the geographic information system.

The server 12 can be connected to a network 18 such as to provide for communication between the management server and various services, devices and data stores that can collectively form the system 10. The network 18 can be a local area network, a wide area network, or a combination of different various network topologies, which may include physical transmission media (for example, electrically conductive, optical fiber media or the like) and/or wireless communications media, that can be utilized for communicating information. The network or at least a portion of the methods and functions implemented thereby can operate in a secure manner (for example, behind a firewall separated from public networks) and/or utilize encryption for data communications. As a further example, the server 12 can be implemented as a computing cloud in which the functions and methods and data can be accessible as a service via the network 18.

The server 12 can employ the network 18 to access system data 20, an encounter server 22, as well as one or more other services generally indicated at 24. These other services 24 can correspond to various other servers that can store and provide information pertinent to three-dimensional volumetric indoor location geocoding. Such other services 24 may also execute methods and functions that can be utilized by the server 12, such as via corresponding application interfaces. The particulars of such other services 24 can vary according to the particular purpose of the geographic information system.

In addition to geographic data that may be stored in a database 40, the server 12 can also access a knowledge base 42 or one or more other data sources, indicated at 44. The knowledge base 42 can be utilized to access a variety of information and matching algorithms that may be utilized by users of the system 10. Such information contained in the knowledge base 42 or the other data sources 44 may be accessed via a search engine. The server 12 can make such information available to its users via dynamic or configurable links. As an example, the server 12 can present information to a user via one or more web (for example, html) pages that contain dynamic links (for example, hypertext links) to predefined resource locations (for example, uniform resource locations (URLs)) at which pertinent information corresponding to the system data 20 can be provided. As disclosed herein, the server 12 can be programmed to automatically select the information according to the real-time conditions of geographic locations and/or user's preferences. The server 12 can provide an encounter GUI (for example, a page) that is populated with such selected information and/or links to such information.

Authorized users can also employ one or more corresponding user device 46 to access information generated by the server 12. There can be any number of user devices 46 that can access the information from the server 12. A given user device 46 can include a user interface 48 that allows the user to access the functions and methods implemented by the server 12 as well as to retrieve related content information. The user interface 48, for example, can include a web browser (or a thin client application) that can be provided dynamic links for accessing the functions and methods corresponding to the server 12. It is to be appreciated that such user device 46 can be a computer, a work station, as well as a mobile device (for example, a smart phone, laptop or tablet computer) that can run a corresponding application programmed to access the functions and methods associated with the server 12. The user device 46 can be located in a corresponding local area as well as can be implemented as a remote device that can access the information produced by the server 12, such as by accessing corresponding pages via a web browser or other application.

The server 12 can include an engine 52 programmed to evaluate information and data pertinent to three-dimensional volumetric indoor location geocoding. The engine 52 can receive the data from various inputs, as well as from data available from other sources such as the system data 20, the encounter server 22 and other services 24. The engine 52 can be programmed to analyze such information based on one or more expressions and compute decision support data that can be employed to populate a visualization space that is presented to one or more users. The engine 52 can also be programmed to search the system data 20 or other sources for pertinent geographic locations. For example, the system 10 can automatically generate matching criteria by populating the visualization space with relevant information and/or links to information stored in the knowledge base 42 or in the other data 44. Data acquired by the server 12 can be stored in the memory 16 or another database, such as may be part of the system data 20.

The system 10 can also include an 61, layout engine 61, that is programmed to control populating the layout of a visualization space. The layout can include a static layout, a dynamic layout or a combination of static and dynamic layouts. A static layout, for example, can be configured to provide guidance and support data for each of one or more predefined positions in a visualization space. For example, a user can select a set of locations (for example, different associates) and the layout engine 61 can populate the visualization space with a GUI element to provide guidance information for each selected location. In this example, the layout engine 61 can populate the visualization space with the GUI element for each location statically (for example, regardless of the results of any expressions). The engine 61 can also dynamically populate the visualization space based on one or more expressions that are assigned to visualization space. For example, a user can assign an expression to a place holder in the visualization space and only populate the space with a corresponding GUI element depending on the results of the assigned expression. Thus, if the expression criteria is met, the engine 61 can dynamically add a GUI element and if (or when) the criteria is not met any longer, the GUI element can be removed from the visualization space. In this way, the system 10 can employ one or more selected expressions to dynamically control populating a layout based on encounter data.

A user can employ a user interface 62 of the server 12 that can access corresponding tools, such as may be part of a manager 64. The manager 64 can correspond to functions and methods that can be utilized to program or various aspects of the system 10, such as disclosed herein. The accessibility of various functions and methods that can be accessed by a given user can depend upon an individual's authorization or role within the system. For example, there can be any range of roles that can be established within the system 10, which may be based upon existing authentication systems for an enterprise or network in which the system 10 is being implemented. For instance, a supervisor or other individual with a sufficient level of authorization can set the parameters for controlling the global guidance module 58.

A system administrator further may be able to create and configure interfaces, such as including one or more device interfaces 66, to control communication and retrieval of data from various resources in the system 10. The device interface 66 thus can create a communications channel via the network for retrieving relevant data. The retrieved data can include raw data, processed data or a combination of raw and process data that can be presented in the form of content to a given user. Additionally, an individual user may also employ the user interface 62 to access preferences via the manager 64, such as to establish parameters that control the guidance module 58 for such user, set up user devices 46 and other personal settings. In the exemplary embodiment, the geographic information system is a web-based SaaS (software as a service) application designed to facilitate more efficient, economical, and faster operations by the processor 14.

The geographic information system 10 is configured to convert textual civic addresses with sub-address elements into three-dimensional volumetric geometries at varying resolutions. Additionally, the geographic information system 10 is configured for a specialized geographic database representing a building or venue, wherein the total three-dimensional space of the building or venue is notionally subdivided into an array of discrete elements or dimensional cubes or other suitable three-dimensional shapes or forms. Furthermore, the geographic information system 10 is configured for increasing refinement of geographic locations for the array of discrete elements.

Figure 2:
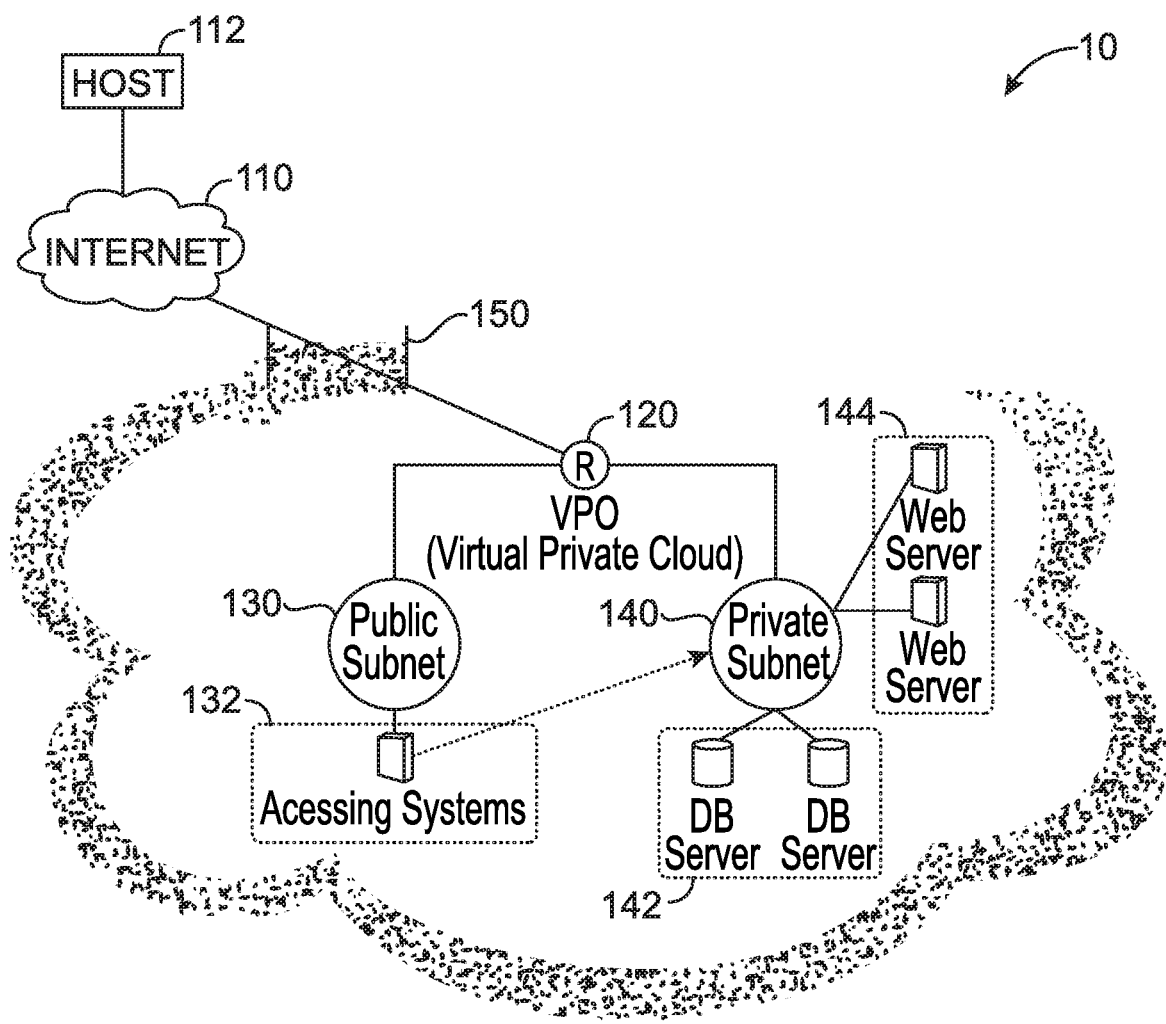
FIG. 2 is a schematic view of an exemplary architectural diagram of the geographic information system of FIG. 1.

FIG. 2 is a schematic view of an architectural diagram of the geographic information system 10. In FIG. 2, a host 112 connects to the Internet 110 and then through firewall 150 to access virtual private cloud 120 and to thereby access public subnet 130 and associated public accessing systems 132. Similarly, host 112 can also access private subnet 140 and associated database servers 142 and web servers 144.

Figure 3:
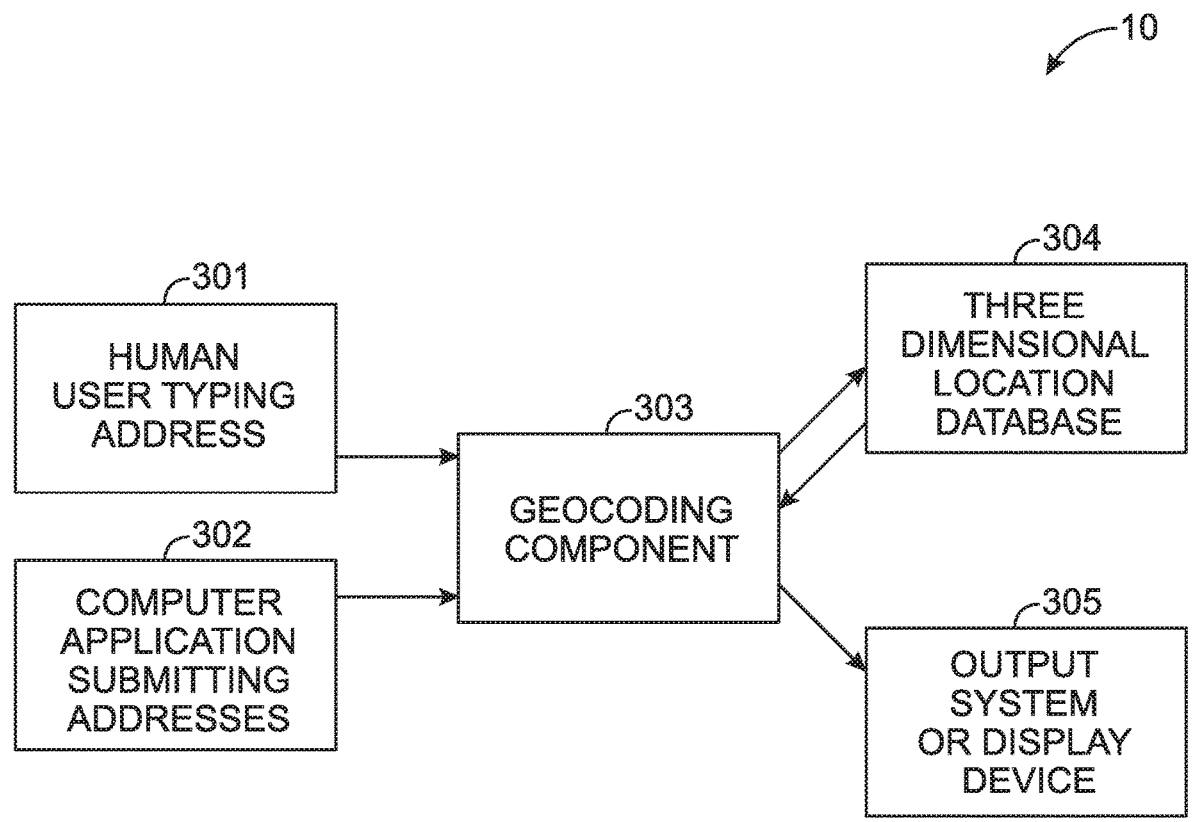
FIG. 3 is an exemplary block diagram of components of the exemplary geographic information system for three-dimensional volumetric indoor location geocoding.

FIG. 3 is a block diagram of components of the geographic information system 10 for three-dimensional volumetric indoor location geocoding. In the exemplary embodiment, textual addresses are submitted to the geocoding component 303 by either a human user 301 or another computer application providing or submitting address data 302. As described above, in some embodiments the geographic information system 10 is configured to perform "reverse geocoding" by receiving an input that is processed into a textual civic address. In one example, the geographic information system 10 receives a set of location coordinates identifying a geographic location that can be processed into a textual civic address. In a second example, the geographic information system 10 receives a drawn spatial input comprising a two-dimensional or three-dimensional input over a map. In a third example, the geographic information system 10 receives a set of geometric coordinates identifying a spatial region of a map. In such reverse geocoding examples, the geographic information system 10 is configured to process these preliminary inputs into a textual civic address.

The geocoding component 303 submits a query to a database 304 containing an array of three-dimensional discrete elements representing locations such as, but not limited to, buildings, campus, or venue locations. The database 304 returns a list of all discrete elements matching the search query parameters to the geocoding component 303. The geocoding component 303 computes a three-dimensional logical union of the returned discrete elements, and sends the resulting three-dimensional geometry to an output system or display device 305.

Figure 4:
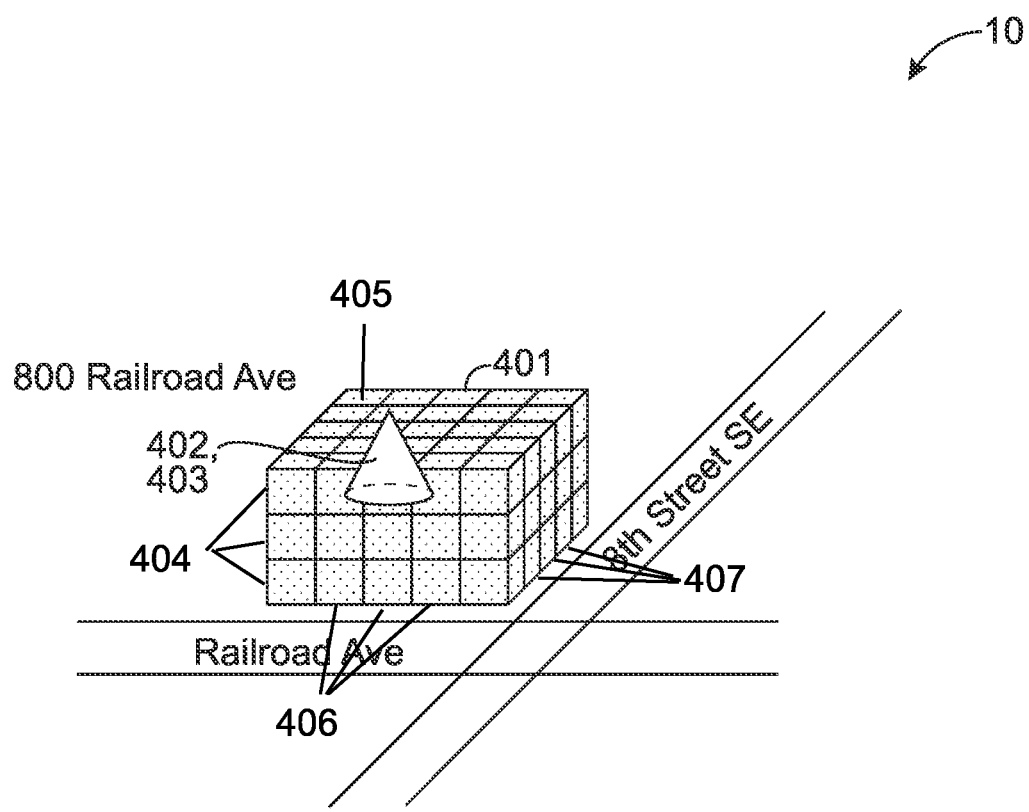
FIG. 4 is a schematic view of the geographic information system and an exemplary rectangular office building with three floors.

FIG. 4 is a schematic view of the geographic information system 10 and an exemplary rectangular office building with three floors. As shown, an office building 401 may be subdivided into an array of equally sized three-dimensional cubes. In some embodiments, the office building 401 may be subdivided into other three-dimensional objects other than cubes including, for example, prisms, pyramids, spheres, polygons, and other suitable three-dimensional shapes 402 and 403. In some embodiments, the office building 401 may be subdivided using more than one type of three-dimensional shape.

As illustrated in FIG. 4, the array of cubes includes a plurality of layers 404 of the cubes 405. Each of the cubes 405 represents an individual workspace in the building 401. Each layer 404 includes a plurality of rows 406 of the cubes 405 and a plurality of columns 407 of the cubes 405.

FIG. 5 is a schematic view of the geographic information system 10 and an exemplary rectangular office building broken into an evenly spaced notional array of discrete three-dimensional cubes, where each individual cube represents an individual workspace in the building. As shown, each discrete three-dimensional cube is attributed with an array of information including, for example only, street address, floor, room, and seat. Three cubes are highlighted as an example: one cube on the first floor 503, one cube on the second floor 502, and one cube on the third floor, 501. Geocoding the civic address of "800 Railroad Ave, Floor 1, Seat 1" returns a list of geodetic coordinates representing by single cube 504. In some examples, the office building may be alternately broken into other discrete three-dimensional shapes as described above.

FIG. 6 is a schematic view of the geographic information system 10 and an exemplary rectangular office building broken into an evenly spaced notional array of discrete three-dimensional cubes, where each individual cube represents an individual workspace in the building, and also may be grouped by coarser grained location information such as floor and room to form larger geometric shapes. As shown, all cubes 601 containing the attribute 603 "800 Railroad Ave" and "Floor 3" in their individual attribute arrays combine to form a single three-dimensional shape 602. All cubes 604 containing the attribute 606 "800 Railroad Ave" and "Floor 3" and "Room 2" in their individual attribute arrays combine to form a single three-dimensional shape 605. All cubes 607 containing the attribute 609 "800 Railroad Ave" and "Floor 3" and "Room 2" and "Seat 10", in their individual attribute arrays, of which there is only one in the entire building array, is represented by the single three-dimensional cube 608. In some examples, the office building may be alternately broken into other discrete three-dimensional shapes as described above.

The geographic information system 10 is configured to convert text based street addresses that may include sub-address elements into three-dimensional geodetic representations of a discrete location. Such sub-address elements may include areas within the designated discrete location. Alternately, the sub-address elements may include areas adjacent to, proximate to, above, or below the designated discrete location. The geographic information system 10 is configured to enable mapping and display of said text based street addresses in a three-dimensional map display on a computer screen, an electronic display, a projected display, mobile devices displays for devices including tablet computers and mobile phones, smart glass displays, augmented reality device displays, mixed reality device displays, and virtual reality device displays. Moreover, geographic information system 10 is configured to enable users to visualize the locations of discrete areas inside buildings in venues in relation to other areas in the building or venue in turn enabling faster decision making when searching for locations inside buildings and venues. geographic information system 10 is configured to validate text based street addresses with sub-address elements, both in order to verify the existence of a location and to verify correct spelling and notation for address elements.

The geographic information system includes systems and methods of converting civic addresses with sub-address elements into three-dimensional geodetic volumes described by coordinate information such as latitude, longitude, and elevation values. The system can quickly convert indoor locations of different resolutions expressed in textual format such as street address, place type, floor, unit, room, and seat into three-dimensional polygons that can be used to find and depict said locations on a digital map or other cartographic representation of a building, campus, venue, or other geographic area. The system may operate on civic locations that are typed into a computer application by a human user or received electronically one at a time or in batch from another computer application.

As an example of the geographic information system 10, a three floor building is contained within a notional minimum bounding rectangular box. Each floor has two offices (units), and each office has 25 10-foot by 10-foot cubicle workspaces (seats), and each floor is 10 feet high. The minimum bounding rectangular box is notionally subdivided into an array of discrete 10'×10'×10' cubes. Each discrete cube is attributed with an array of values containing, for example only, street address, floor, room, and seat. All of the discrete cubes are attributed with the same street address. Twenty five of the discrete cubes are attributed with "Floor 1", 25 with "Floor 2", and 25 with "Floor 3". The discrete cubes are attributed with a seat number. Some discrete cubes are attributed with "Room 1" and some with "Room 2" depending on their location on each floor. In some examples, the floor may be alternately broken into other discrete three-dimensional shapes as described above.

Markets for the geographic information system 10 include, but are not limited to, emerging 9-1-1 emergency call handling systems and computer aided dispatch systems, which may evolve in the future to include not presently available indoor locations for mobile phones calling 9-1-1 from inside buildings and venues. Users can include, for example only, any/all emergency call takers, dispatchers, and emergency responders, including but not limited to users in 9-1-1 Public Safety Answering Points (PSAPs), and other users responding to emergency calls for service, as well as call routing systems, location validation systems, and location information systems.

The geographic information system differentiates from existing geocoding systems and methods by at least one of: (a) providing a means of geocoding indoor locations including in multi-story buildings, and (b) by returning three-dimensional geodetic geocoding results representing three-dimensional volumes instead of two dimensional discrete points; and (c) by returning three-dimensional geodetic geocoding results of varying size and volume based on the number and type of sub-address elements included in the text of the civic address to be geocoded.

Highly accurate location identification is both urgent and critical in many situations including, but not limited to emergency response. The lack of geocoding capabilities for indoor locations in the prior art otherwise risks imprecise location identification in many situations. As such, the systems and methods disclosed herein allow for improved accuracy of location identification that constitutes a specific improvement to the systems, methods, and user interfaces used in geocoding and a specific implementation of a solution to a problem in the art.

A technical effect of the systems and methods described herein includes at least one of: (a) providing a means of geocoding indoor locations including in multi-story buildings, and (b) by returning three-dimensional geodetic geocoding results representing three-dimensional volumes instead of two dimensional discrete points; and (c) by returning three-dimensional geodetic geocoding results of varying size and volume based on the number and type of sub-address elements included in the text of the civic address to be geocoded.

In the specification and the claims, reference will be made to a number of terms, which shall be defined to have the following meanings. The singular forms "a", "an", and "the" include plural references unless the context clearly dictates otherwise. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the term "computer" and related terms, for example, "computing device", are not limited to integrated circuits referred to in the art as a computer, but broadly refers to a microcontroller, a microcomputer, a programmable logic controller (PLC), an application specific integrated circuit, and other programmable circuits, and these terms are used interchangeably herein. Further, as used herein, the terms "software" and "firmware" are interchangeable, and include any computer program stored in memory for execution by personal computers, workstations, clients and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

Processor is not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not limited to, a scanner. Furthermore, in the exemplary embodiment, additional output channels may include, but not be limited to, an operator interface monitor. The above examples are exemplary only, and thus are not intended to limit in any way the definition and/or meaning of the term processor.

Exemplary embodiments of geographic information system are described herein. The methods and systems are not limited to the specific embodiments described herein, but rather, components of systems and/or steps of the methods may be utilized independently and separately from other components and/or steps described herein. For example, the methods may also be used in combination with other manufacturing systems and methods, and are not limited to practice with only the systems and methods as described herein. Rather, the exemplary embodiment may be implemented and utilized in connection with many geographic location applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A computer implemented method for three-dimensional volumetric indoor location geocoding relative to a geographic location, the method comprising:
   creating a three-dimensional representation of the geographic location;
   notionally subdividing the three-dimensional representation into an array of discrete element cubes, wherein the discrete element cubes are in a plurality of layers and wherein each layer comprises a plurality of rows of the discrete element cubes and a plurality of columns of the discrete element cubes;
   receiving an address and converting the address into geographic coordinates;
   querying the array of discrete element cubes representing the geographic location;
   determining a list of all discrete element cubes with at least one of a matching address and sub-address element attribute;
   generating a notional minimum bounding three-dimensional polygon containing the matched discrete element cubes with the at least one matched address and matched sub-address element attribute;
   determining a list of geodetic coordinates defining the minimum bounding three-dimensional polygon; and
   presenting the list of geodetic coordinates defining the minimum bounding three-dimensional polygon.

2. The computer implemented method of claim 1 wherein each discrete element cube of the array of discrete element cubes comprises a three-dimensional polygon shape representing the geographic location.

3. The computer implemented method of claim 2 wherein the three-dimensional polygon comprises a three-dimensional cube having a plurality of geodetic coordinate pairs.

4. The computer implemented method of claim 3 wherein the plurality of geodetic coordinate pairs comprises eight geodetic pairs.

5. The computer implemented method of claim 3 wherein the three-dimensional cube comprises an array of location information, wherein each element of the array includes increasing refinement of location.

6. The computer implemented method of claim 5 wherein the increasing refinement of location comprises at least one of a street address, a building name, a place type, a unit, a room, and a seat.

7. The computer implemented method of claim 1 wherein receiving the address comprises receiving at least one of a textual address, an audible address, and a digital address.

8. The computer implemented method of claim 1 further comprising mapping and displaying a textual street address of the geodetic pairs in a three-dimensional map display.

9. The computer implemented method of claim 8 further comprising validating the text address with a sub-address element.

10. The computer implemented method of claim 9 further comprising validating the text address with a sub-address element to verify an existence of the geographic location.

11. The computer implemented method of claim 9 further comprising validating the text address with a sub-address element to verify a correct spelling and notation for address elements.

12. The computer implemented method of claim 1 further comprising returning three-dimensional geodetic geocoding of varying size and volume based at least on the number and type of sub-address elements included a text of a civic address.

13. The computer implemented method of claim 1, wherein the discrete element cubes are evenly spaced.

14. The computer implemented method of claim 1, wherein the discrete element cubes are equally sized.

15. A computer device for three-dimensional volumetric indoor location geocoding relative to a geographic location, the computer device comprising:
   a memory device configured to store the geographic location;
   an interface device coupled to the memory device and configured to receive input instructions;
   a processor coupled to the memory device and the interface device, the processor programmed to:
   create a three-dimensional representation of the geographic location;

notionally subdivide the three-dimensional representation into an array of discrete element cubes, wherein the discrete element cubes are in a plurality of layers and wherein each layer comprises a plurality of rows of the discrete element cubes and a plurality of columns of the discrete element cubes;

receive an address and converting the address into geographic coordinates;

query the array of discrete element cubes representing the geographic location;

determine a list of all discrete element cubes with at least one of a matching address and sub-address element attribute;

generate a notional minimum bounding three-dimensional polygon containing the matched discrete element cubes with the at least one matched address and matched sub-address element attribute;

determine a list of geodetic coordinates defining the minimum bounding three-dimensional polygon; and present the list of geodetic coordinates defining the minimum bounding three-dimensional polygon.

16. The computer device of claim 15 wherein the processor is further programmed to receive at least one of a textual address, an audible address, and a digital address.

17. The computer device of claim 15 wherein the processor is further programmed to map and display a textual street address of the geodetic pairs in a three-dimensional map display.

18. The computer device of claim 17 wherein the processor is further programmed to validate the text address with a sub-address element.

19. The computer device of claim 18 wherein the processor is further programmed to validate the text address with a sub-address element to verify an existence of the geographic location.

20. The computer device of claim 18 wherein the processor is further programmed to validate the text address with a sub-address element to verify a correct spelling and notation for address elements.

21. The computer device of claim 15 wherein the processor is further programmed to return three-dimensional geodetic geocoding of varying size and volume based at least on the number and type of sub-address elements included a text of a civic address.

22. The computer device of claim 15, wherein the discrete element cubes are evenly spaced.

23. The computer device of claim 15, wherein the discrete element cubes are equally sized.

24. One or more non-transitory computer-readable media having computer-executable instructions embodied thereon for three-dimensional volumetric indoor location geocoding relative to a geographic location using a computer device having a memory and a processor, wherein when executed by the processor, the computer-executable instructions cause the processor to:

create a three-dimensional representation of the geographic location;

notionally subdivide the three-dimensional representation into an array of discrete element cubes, wherein the discrete element cubes are in a plurality of layers and wherein each layer comprises a plurality of rows of the discrete element cubes and a plurality of columns of the discrete element cubes;

receive an address and converting the address into geographic coordinates;

query the array of discrete element cubes representing the geographic location;

determine a list of all discrete element cubes with at least one of a matching address and sub-address element attribute;

generate a notional minimum bounding three-dimensional polygon containing the matched discrete element cubes with the at least one matched address and matched sub-address element attribute;

determine a list of geodetic coordinates defining the minimum bounding three-dimensional polygon; and present the list of geodetic coordinates defining the minimum bounding three-dimensional polygon.

* * * * *

UNITED STATES PATENT AND TRADEMARK OFFICE
CERTIFICATE OF CORRECTION

PATENT NO. : 10,928,202 B2
APPLICATION NO. : 15/856690
DATED : February 23, 2021
INVENTOR(S) : Brosowsky et al.

Page 1 of 1

It is certified that error appears in the above-identified patent and that said Letters Patent is hereby corrected as shown below:

In the Specification

Column 8, Line 21, Insert --Engine-- after "an" and before "61".

Signed and Sealed this
Eighteenth Day of May, 2021

Drew Hirshfeld
*Performing the Functions and Duties of the
Under Secretary of Commerce for Intellectual Property and
Director of the United States Patent and Trademark Office*